Figure 1:
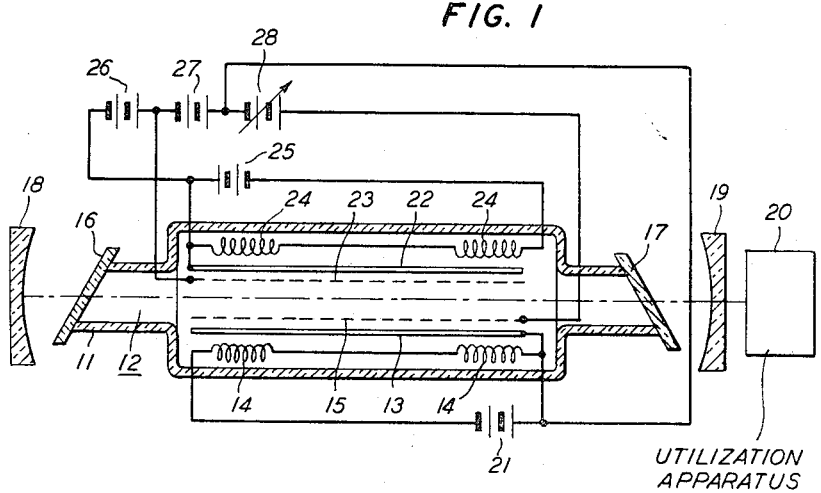

INVENTORS W. E. LAMB, JR.
P. K. TIEN

3,403,353
GAS LASER HAVING A SECOND CATHODE FOR SPACE CHARGE NEUTRALIZATION
Willis E. Lamb, Jr., New Haven, Conn., and Ping K. Tien, Chatham Township, Morris County, N.J., assignors to Bell Telephone Laboratories, Incorporated, New York, N.Y., a corporation of New York
Filed Apr. 8, 1965, Ser. No. 446,588
7 Claims. (Cl. 331—94.5)

This invention relates to optical maser devices and, more particularly, to an optical maser of the gas tube type pumped by an electron beam.

The optical maser, also called the laser as an acronym for light amplification by stimulated emission of radiation, is a source of radiation having characteristics that promise to be useful for communications and many other applications.

Gas lasers utilize a gaseous active medium and generally require a lower pumping power than crystalline lasers. For example, a gas laser may be pumped by nearly monoenergetic electrons emitted from a hot oxide cathode as disclosed in the article, "Electron Beam Excitation of Gas Laser Transitions and Measurements of Cross-Sections of Excitation," by P. K. Tien, D. MacNair and A. L. Hodges, Physical Review Letters, volume 12, No. 1, Jan. 6, 1964.

In such a laser, electrons emitted from the cathode are first accelerated to the desired potential by a fine mesh grid and then penetrate into the grid-anode space, where they collide with the gas atoms to establish a population inversion between a specific pair of optically connected energy levels in the gas. The center frequency of the emitted radiation is uniquely determined by the energy difference associated wtih this pair of energy levels.

Unfortunately, slight ionization of the gas is desired in order to provide enough positive ions to neutralize at least partially the space charge of the electrons in the vicinity of the beam of the stimulated radiation in the grid-anode space. In other words, sufficient positive ions should be present to establish a substantially uniform potential distribution near the beam of stimulated radiation, as disclosed in the above-cited article. To provide these positive ions the cathode-to-grid potential of the laser is raised above the ionization potential of the gas mixture. In the gas tube laser of the above-cited article, the ($2s_2$–$2p_4$) transition, in Paschen notation, was of interest. Since this is best excited by a grid-to-cathode voltage of 19 volts, which is lower than the 21.56 volts ionization potential of neon, it was necessary to mix xenon with the neon, so that the grid-to-cathode potential exceeds the ionization potential of the xenon. The xenon complicates the operation of the tube. For example, it increases the difficulty of measuring cross sections of excitation of neon. It also detracts from the effectiveness of the electron beam in establishing a population inversion for the ($2s_2$–$2p_4$) transition, so that the radiation obtained is relatively weak.

Applicants recognize that there are many reasons why it is desirable to operate with a pumping grid-to-cathode potential lower than the ionization potential of the gas or any part thereof. For example, a population inversion between the chosen pair of energy levels could be more directly and strongly excited, the stimulated radiation being correspondingly strong. As a further example, cross sections of excitation of the gas could be measured for a wide range of energies of the monoenergetic pumping electron beam below those energies that ionize the gas.

It is an object of this invention to pump a gas tube laser with a monoenergetic electron beam having an energy below that needed to ionize the gas.

According to the invention, a second thermionic cathode and a second grid are utilized in an electron tube gas laser and biased to maintain a supply of positive ions to tend to neutralize the electron space charge in the vicinity of the laser beam. The second cathode and second grid are a source of electrons having energies different from the monoenergetic beam and sufficient to ionize the gas. A new result is that the potential between the original cathode and the original grid can be below the gas ionization potential and can produce a greater population inversion between a pair of levels associated with a desired radiative transition. This transition can now produce much stronger stimulated radiation than heretofore.

Preferably, the cathodes are disposed opposite each other so that both grids are interposed between them; and the cathodes and both grids are elongated parallel to the elongation of the tube, i.e., to the direction in which the beam is intended to propagate. It is sufficient that the thermal emission of the second cathode is a small fraction of the emission from the first cathode, as will be explained hereinafter.

In its broadest aspects the invention involves a first pair of electrodes biased one with respect to the other to produce the desired population inversion for laser action and a second pair of electrodes biased to generate a supply of positive ions in the region intended for propagation of the laser beam.

Figure 2:
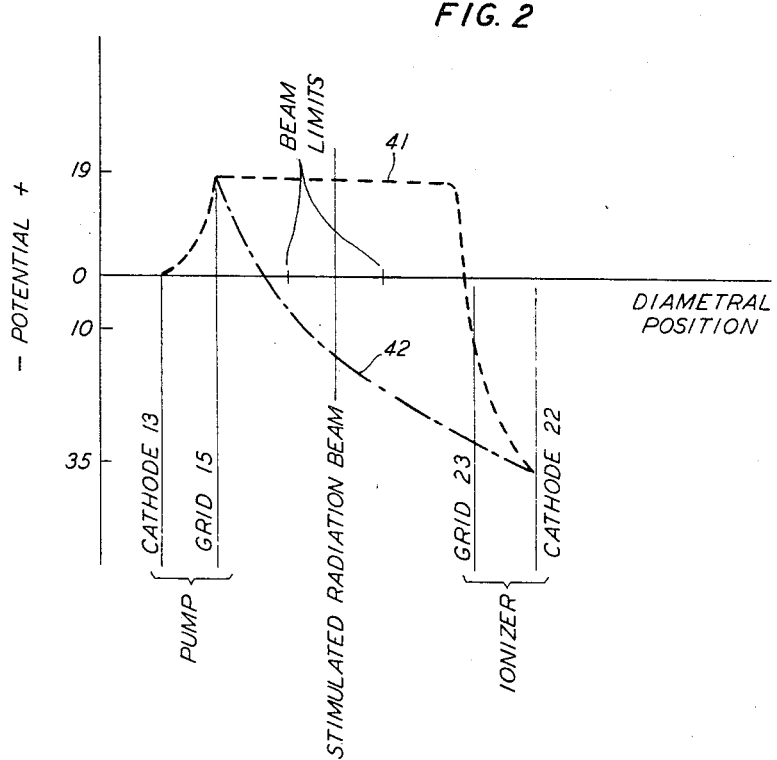

Other features and advantages of the invention will become apparent from the following detailed description and the drawing in which:

FIG. 1 is a partially schematic and partially pictorial illustration of a preferred embodiment of the invention, and FIG. 2 shows potential distribution curves that are helpful in understanding the theory and operation of the invention.

In FIG. 1, a glass tube 11 contains neon gas, which is the active material of the laser. An oxide cathode 13 is heated by a heater 14 to emit electrons, which are accelerated by a wire mesh grid 15 toward the center of the tube in a broad ribbon-like beam. The heater 14 is connected across heater voltage source 21. Grid 15 is biased with respect to cathode 13 by the variable potential source 28 so that the accelerated electrons have energies appropriate for pumping the laser gas, i.e., for producing a population inversion between a pair of optically connected energy levels of the gas mixture.

Glass tube 11 is provided with end windows 16 and 17 disposed at Brewster's angle through which stimulated radiation may pass. Reflectors 18 and 19 are disposed beyond the end windows 16 and 17 in order to form a resonant cavity for the stimulated radiation. Reflector 19 is partially transmissive in order to pass a portion of the stimulated radiation to utilization apparatus 20.

In accordance with the specific illustrated embodiment of the invention, a second oxide cathode 22 is disposed opposite oxide cathode 13 with respect to the axis of the tube 11. Cathode 22 is heated by a heater 24 to emit electrons, which are accelerated by a wire mesh grid 23 toward the center of the tube in a broad ribbon-like beam. The heater 24 is connected across a heater voltage source 25, which is of a magnitude with respect to the magnitude of source 21 that is appropriate for making the electron emission from cathode 22 a small fraction, advantageously 1/100 to 1/10, of the electron emission from cathode 13. The grid 23 is biased with respect to the cathode 22 by the potential source 26 to provide the electrons emitted from cathode 22 with energies sufficient to ionize neon atoms upon impact. Potential source 27 is connected between grid 23 and cathode 13 to establish a bias between the two cathode-grid combinations to cause the highly mobile free electrons to be swept out of the inter-grid space by grid 15. It is noted that grids 15 and 23 are accelerating electrodes, instead of traditional control grids. In addition, grid 15 is an electron-collecting anode as well as an accelerating electrode.

Reflectors 18 and 19 may be of the confocal or near-confocal type or any other type known in the art and preferably are sufficiently reflective to raise the laser gain to the oscillation point for the pumping power actually supplied by cathode 13, grid 15, heater 14 and sources 21 and 28. Alternatively, to use the laser as a straight-through amplifier, reflectors 18 and 19 may be eliminated.

Utilization apparatus 20 may be measuring apparatus responsive to the stimulated radiation and adapted, for example, to measure cross sections of excitation. It could also be communication equipment, such as a modulator or a parametric amplifier.

The heater voltage sources 21 and 25 may have the same potential if the desired relative electron emissions are provided by a correspondingly small area of cathode 22 relative to cathode 13.

For convenience in the description that follows, electrons emitted from the cathodes will be designated primary electrons and electrons produced by ionization will be designated secondary electrons.

In operation, the primary electrons emitted by cathode 13 and accelerated by grid 15 are nearly monoenergetic. If potential source 28 is adjusted to provide a grid-to-cathode potential of about 19 volts, these electrons have energies appropriate for producing a population inversion between the energy levels of the neon gas associated with the radiative transition designated as $(2s_2-2p_4)$ in Paschen notation. It is of course understood that, with the laser parameters adjusted as described hereinbefore to provide a gain sufficient for oscillation, the radiative transition may be stimulated by any stray radiation of the appropriate frequency.

In the absence of ionization of the neon provided by second cathode 22 and the second grid 23, the potential profile for a cross section of the laser perpendicular to its axis would be as shown in curve 42 of FIG. 2. It is noted that the beam of stimulated radiation is diametrally positioned in a region of rapidly changing potential, which follows the well-known space charge law. As pointed out in the above-cited article, this rapid change in potential across a cross section of the beam is undesirable, as it interferes with the laser action.

According to the invention, the negative electron space charge that is responsible for this adverse potential gradient in the inter-grid space is at least partially neutralized by the action of primary electrons that are emitted from the cathode 22 and are accelerated by grid 23 sufficiently to ionize neon atoms in the inter-grid space upon impact. Because electrons are much more mobile than the heavy positive ions, the secondary electrons created by ionization, the primary electrons from the cathode 22, and the electrons from cathode 13, to the extent they have released energy in maintaining the population inversion, are swept out of the inter-grid space and collected by grid 15, the most positive electrode, much more rapidly than the heavy and relatively immobile positive ions can recombine with electrons. The positive ions at least partially neutralize the uncollected electrons to produce the potential distribution illustrated in curve 41 of FIG. 2. This potential distribution is substantially flat from grid 13 across the inter-grid space to a region a short distance from grid 23.

Because of the relative ion and electron mobilities, a very small flow of ionizing electrons, preferably one or two orders of magnitude smaller than the flow of pumping electrons, serves to maintain the potential gradient of curve 41 within the inter-grid region.

Moreover, because the flow of ionizing electrons is thus relatively small, very few of them strike cathode 13, despite its positive bias with respect to grid 23. To the extent they do strike cathode 13, this effect can be neglected.

The invention is also applicable to laser active gases other than neon and even to mixed gases.

What is claimed is:

1. Apparatus adapted for the stimulated emission of radiation, comprising a member containing an active medium, means associated with said member for forming an optical cavity resonator, means for pumping said active medium with a substantially monoenergetic electron beam to establish a population inversion between a pair of optically connected energy levels of said active medium, and means for supplying positive ions to neutralize at least partially the space charge within the portion of said member traversable by said radiation, said supplying means including a source of electrons having energies different from said monoenergic beam and sufficient to ionize said active medium.

2. Apparatus adapted for the stimulated emission of radiation, comprising an elongated member containing an active medium, a pair of means associated with said member for forming an optical cavity resonator, means for pumping said active medium with an electron beam, said pumping means including a first pair of electrodes elongated parallel to the elongation of said member and biased to establish a population inversion between a pair of optically connected energy levels of said active medium, and means for supplying positive ions to neutralize at least partially the electron space charge within a portion of said elongated member traversable by said radiation, said supplying means including a second pair of electrodes elongated parallel to the elongation of said member and biased one with respect to the other above the ionization potential of said active medium.

3. Apparatus adapted for the stimulated emission of radiation, comprising an elongated member containing a gaseous active medium, a pair of means associated with said member for forming an optical cavity resonator, means for pumping said active medium with an electron beam, said pumping means including a first pair of electrodes elongated parallel to the elongation of said member and biased one with respect to the other below the ionization potential of said active medium, and means for supplying positive ions to neutralize at least partially the electron space charge within a portion of said elongated member traversable by said radiation, said supplying means including a second pair of electrodes elongated parallel to the elongation of said member and biased one with respect to the other above the ionization potential of said active medium.

4. Apparatus adapted for the stimulated emission of radiation, comprising an elongated member containing a gaseous active medium, means associated with said member for forming an optical cavity resonator, a first thermionic cathode and a first grid elongated parallel to the elongation of said member and adapted to generate an electron beam appropriate for producing laser action in said active medium, said first grid being biased positively with respect to said first cathode, a second thermionic cathode and a second grid elongated parallel to the elongation of said member and adapted to supply positive ions between said grids.

5. Apparatus according to claim 4 in which said first cathode and said first grid are disposed opposite said second cathode and said second grid with respect to said radiation.

6. Apparatus according to claim 4 in which the second cathode is adapted to supply at least an order of magnitude fewer electrons per unit time than said first cathode, the second grid being biased positively with respect to said second cathode, said electrons from said second cathode producing positive ions by collision with atoms of the gaseous active medium.

7. Apparatus according to claim 6 including biasing means for making free electrons collectable by the first grid, said biasing means being connected between the first cathode and the second grid in a polarity to make said first cathode positive with respect to said second grid.

No references cited.

JEWELL H. PEDERSEN, *Primary Examiner.*

E. BAUER, *Assistant Examiner.*